United States Patent
Saravanan et al.

(10) Patent No.: US 12,321,994 B2
(45) Date of Patent: Jun. 3, 2025

(54) METHOD AND SYSTEMS FOR GENERATING PRESCRIPTION PLANS FOR A REGION UNDER CULTIVATION

(71) Applicant: MAHINDRA & MAHINDRA LIMITED, Tamil Nadu (IN)

(72) Inventors: Natarajan Saravanan, Chengalpattu (IN); Rajeswar Kuchimanchi, Chengalpattu (IN); Shankar Venugopal, Chengalpattu (IN); Aravind Bharadwaj, Chengalpattu (IN); Ananda Kundu, Chengalpattu (IN); Ram Mohan Sitaraman, Chengalpattu (IN); Dayan Sheriff, Chengalpattu (IN)

(73) Assignee: MAHINDRA & MAHINDRA LIMITED, Chengalpattu (IN)

( * ) Notice: Subject to any disclaimer, the term of this patent is extended or adjusted under 35 U.S.C. 154(b) by 709 days.

(21) Appl. No.: 17/268,341

(22) PCT Filed: Nov. 29, 2018

(86) PCT No.: PCT/IN2018/050800
§ 371 (c)(1),
(2) Date: Feb. 12, 2021

(87) PCT Pub. No.: WO2020/035875
PCT Pub. Date: Feb. 20, 2020

(65) Prior Publication Data
US 2021/0315150 A1    Oct. 14, 2021

(30) Foreign Application Priority Data

Aug. 16, 2018    (IN) .............................. 201841030762

(51) Int. Cl.
*G06Q 50/02*    (2024.01)
*A01B 79/00*    (2006.01)
(Continued)

(52) U.S. Cl.
CPC ........... *G06Q 50/02* (2013.01); *A01B 79/005* (2013.01); *G06F 18/24* (2023.01); *G06V 20/188* (2022.01);
(Continued)

(58) Field of Classification Search
CPC ..................................................... G06Q 50/02
See application file for complete search history.

(56) References Cited

U.S. PATENT DOCUMENTS

10,241,097 B2 *   3/2019   Miresmailli ........... G01D 11/30
10,871,480 B2 *  12/2020   Miresmailli ........... G06N 20/00
(Continued)

*Primary Examiner* — Michael A Berns
(74) *Attorney, Agent, or Firm* — Maschoff Brennan (57) ABSTRACT

The embodiments herein disclose methods and systems for generating a prescription plan for a region under cultivation, a system includes a first data acquisition device coupled to a first vehicle, a second data acquisition device coupled to a second vehicle and a controller. The first data acquisition device and the second data acquisition device collect information from a first portion and a second portion of a canopy structure present in the region under cultivation respectively. The collected information may include imagery information, sensory information and geo-positioning information. Based on the collected information, the controller identifies at least one event across at least one of the first portion and the second portion of the canopy structure. The controller further generates an event map and a remedy plan for the identified at least one event. Based on the event map and the remedy plan, the controller generates the prescription plan.

15 Claims, 9 Drawing Sheets

(51) Int. Cl.
*G06F 18/24* (2023.01)
*G06V 20/10* (2022.01)
*H04W 4/021* (2018.01)
*B64U 101/30* (2023.01)
*B64U 101/40* (2023.01)

(52) U.S. Cl.
CPC ......... *H04W 4/021* (2013.01); *B64U 2101/30* (2023.01); *B64U 2101/40* (2023.01); *B64U 2201/20* (2023.01)

(56) References Cited

U.S. PATENT DOCUMENTS

| | | | |
|---|---|---|---|
| 10,953,985 B2* | 3/2021 | Hackert | B64C 39/024 |
| 11,113,649 B2* | 9/2021 | Ethington | G06Q 10/04 |
| 2021/0315150 A1* | 10/2021 | Saravanan | A01B 79/005 |
| 2021/0321553 A1* | 10/2021 | Saravanan | B25J 9/1679 |

* cited by examiner

METHOD AND SYSTEMS FOR GENERATING PRESCRIPTION PLANS FOR A REGION UNDER CULTIVATION

CROSS REFERENCE TO RELATED APPLICATION

This application is based on and derives the benefit of Indian Provisional Application 201841030762 filed on 16 Aug. 2018, the contents of which are incorporated herein by reference.

TECHNICAL FIELD

Embodiments disclosed herein relate to agricultural practices, and more particularly to generating a prescription plan for a region under cultivation.

BACKGROUND

In general, agricultural practices include several activities (manuring, weeding, harvesting and so on) which can be performed on a region under cultivation for efficient crop production. Further, significant strategies can be derived to select and follow the agricultural practices.

Existing approaches involve manual driven strategies to select and follow the agricultural practices. However, manually driven strategies can be error prone and inefficient due to dependency on skill sets of a farmer. Thus, the manual driven strategies may result in incorrect agricultural practices.

In addition, following incorrect agricultural practices can result in wastage of resources and contamination of environment (water, soil, and air). For example, in the conventional approaches, using the manual driven strategies, the farmer can spray a pesticide on all regions irrespective of an infected region without having any real-time information about the infected region

OBJECTS OF THE DISCLOSED EMBODIMENTS

The principal object of embodiments herein is to disclose methods and systems for generating a prescription plan for at least one portion of a canopy structure present in a region under cultivation.

Another object of embodiments herein is to disclose a method for generating an event map for an event identified across at least one portion of the canopy structure.

Another object of embodiments herein is to disclose a method for generating a remedy plan for the event identified across at least one portion of the canopy structure.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for generating prescription plan(s) for at least one portion of a canopy structure present in a region under cultivation. Referring now to the drawings, and more particularly to FIGS. 1 through 7, where similar reference characters denote corresponding features consistently throughout the figures, there are shown embodiments.

Figure 1:
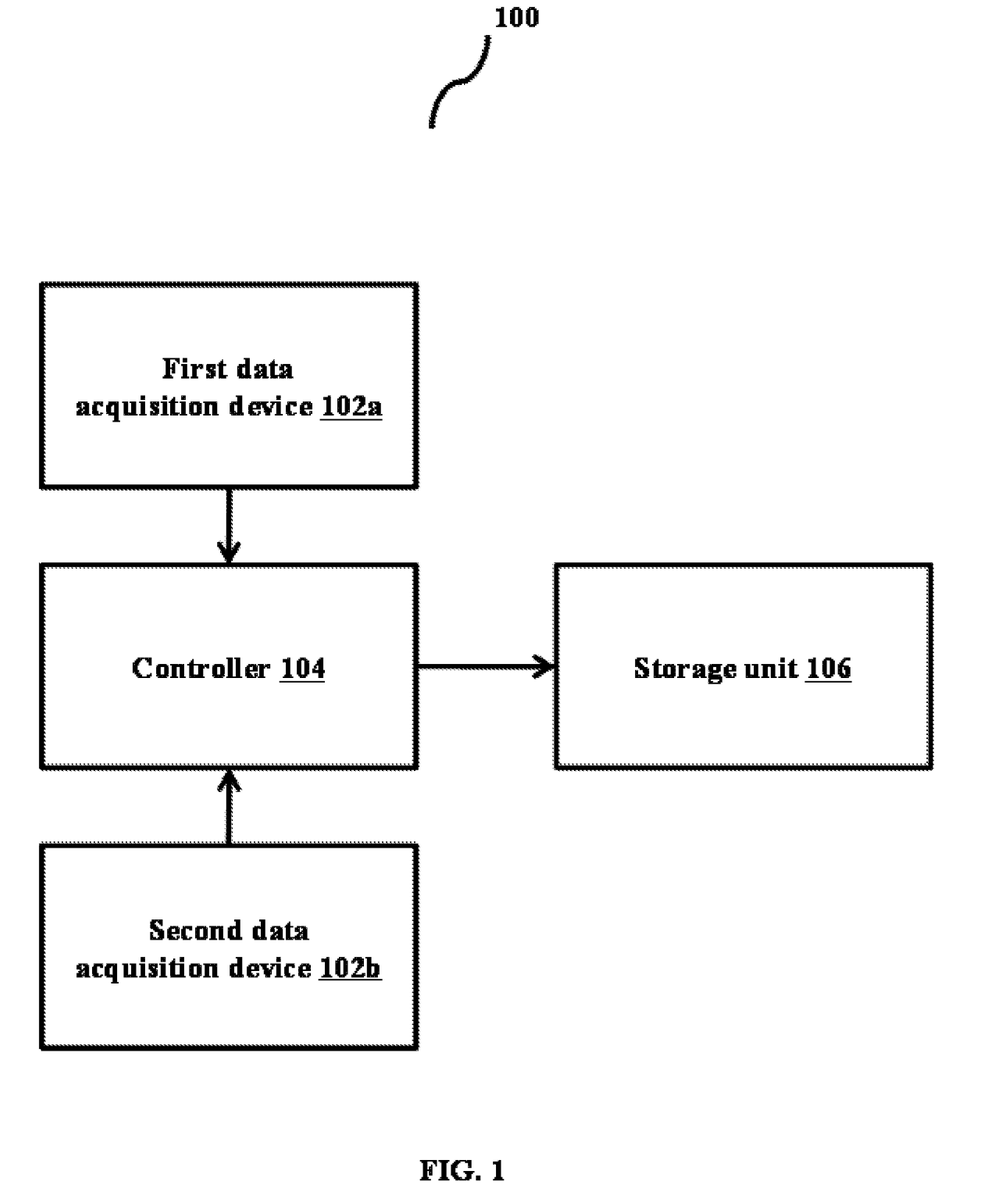
FIG. 1 illustrates a system for generating prescription plan(s) for at least one portion of a canopy structure present in a region under cultivation, according to embodiments as disclosed herein.

FIG. 1 illustrates a system 100 for generating prescription plan(s) for at least one portion of a canopy structure present in a region under cultivation, according to embodiments as disclosed herein. The region under cultivation herein refers to a field/farm/cultivatable area or a portion of a field/farm/cultivatable area, which is being used for cultivation of crops, plants, fruits, and so on. In an embodiment, one or more canopy structures can be present in the region under cultivation.

The system 100 includes a first data acquisition device 102a, a second data acquisition device 102b, a controller 104 and a storage unit 106. The system 100 may also include a server (not shown) and databases (not shown) which include information about events and corresponding remedies (which can be used for generating the prescription plans). In an embodiment, the system 100 may include a cloud computing platform/system. The cloud computing system, such as system 100 can be part of a public cloud or a private cloud. The server may be a standalone server or a server on a cloud. Further, the server may be any kind of computing device such as those, but not limited to a personal computer, a notebook, a tablet, desktop computer, a laptop, a handheld device a mobile device, and so on. Although not shown, some or all of the devices in the system 100 can be connected to a cloud computing platform via a gateway. Also, the cloud platform can be connected to devices (devices of a first vehicle, a second vehicle and so on) located in different geographical locations.

The first data acquisition device 102a can be coupled to a first vehicle 200a. The first vehicle 200a herein refers to at least one of an autonomous vehicle, a semi autonomous vehicle, a manually operated vehicle and so on. An example of the first vehicle 200a can be, but not limited to, a tractor. Embodiments herein are further explained considering the tractor as the first vehicle 200a, but it may be obvious to a person of ordinary skill in the art that any suitable vehicle can be considered. The second data acquisition device 102b can be coupled to a second vehicle 200b. The second vehicle 200b herein refers to at least one of an autonomous vehicle, a semi autonomous vehicle, a manually operated vehicle and so on. An example of the second vehicle 200b can be, but not limited to, a drone. Embodiments herein are further explained considering the drone as the second vehicle 200b, but it may be obvious to a person of ordinary skill in the art that any suitable vehicle can be considered.

The first data acquisition device 102a and the second data acquisition device 102b can be communicatively coupled to the controller 104 through a communication network. Examples of the communication network can be, but is not limited to, the Internet, a wired network, a wireless network (a Wi-Fi network, a cellular network, a Wi-Fi Hotspot, Bluetooth, Zigbee and so on) and so on. The controller 104 can include a processor, a microcontroller, a memory, a storage unit, an input output unit, a display unit and so on. In an embodiment, the controller 104 may be mounted on at least one of the first vehicle 200a and the second vehicle 200b. The controller 104 can be further coupled to the storage unit 106 through the communication network.

The first data acquisition device 102a can be configured to collect at least one of a first imagery information, a second sensory information and a first geo-position from first portion(s) of the canopy structure present in the region under cultivation. The second data acquisition device 102b can be configured to receive at least one of a second imagery information, a second sensory information and a second geo-position from second portion(s) of the canopy structure present in the region under cultivation.

The first portion of the canopy structure includes a field of view below the canopy structure (under canopy portion). Embodiments herein use the terms "first portion", "under canopy portion", "below canopy portion" and so on interchangeably and can refer to the field of view below the canopy structure. The second portion of the canopy structure includes a field of view above the canopy structure (above canopy portion). Embodiments herein use the terms "second portion", "above canopy portion", over canopy portion" and so on interchangeably and can refer to the field of view above the canopy structure. The first imagery information and the secondary imagery information can include images of at least one of soil, crop, plant, fruit, leaves and so on present in the at least one portion of the canopy structure. The first and second sensory information can include information/measurements/characteristics related to at least one of soil, crop, plant, fruit, leaves and so on present in the at least one portion of the canopy structure. The first geo-position and the second geo-position include location information such as, but not limited to, latitude, longitude, elevation and so on related to the first portion and the second portion of the canopy structure respectively.

In an embodiment, the first data acquisition device 102a and the second data acquisition device 102b can use at least one camera to collect the first imagery information and the second imagery information from the first portion and the second portion of the canopy structure respectively. Examples of the cameras can be, but is not limited to, a RGB camera, a thermal camera, an ultraviolet (UV) camera, a multispectral camera and so on. However, it is also within the scope of the embodiments disclosed herein to use any type of cameras without otherwise deterring the intended function of collecting imagery information from the at least one portion of the canopy structure as can be deduced from this description and corresponding drawings.

In another embodiment, the first data acquisition device 102a and the second data acquisition device 102b can use at least one senor to collect the first sensory information from the first portion and the second sensory information from the second portion of the canopy structure respectively. Examples of the sensors can be, but not limited to, a biosensor, an affinity sensor, a temperature sensor, a soil sensor, a humidity sensor, a light intensity sensor, a carbon dioxide concentration sensor, an imagery sensor, a thermography sensor, a non-optical sensor and so on. However, it is also within the scope of the embodiments disclosed herein to use any type of sensors without otherwise deterring the intended function of collecting sensory information from the at least one portion of the canopy structure as can be deduced from this description and corresponding drawings.

In yet another embodiment, the first data acquisition device 102a and the second data acquisition device 102b can use positioning systems to collect the first geo position corresponding to the first portion and the second geo portion corresponding to the second portion of the canopy structure respectively. Examples of the positioning modules can be, but is not limited to, a Global Positioning System (GPS) unit, a Local Positioning System (LPS), a Global Navigation Satellite System (GNSS) and so on. It should be noted that the embodiments disclosed herein may use any type of positioning systems without otherwise deterring the intended function of collecting the geo position corresponding to the at least one portion of the canopy structure as can be deduced from this description and corresponding drawings.

The controller 104 can be configured to generate the prescription plan for the at least one of the first portion and the second portion of the canopy structure present in the region under cultivation. The controller 104 receives at least one of the first imagery information, the first sensory information and the first geo-position from the first data acquisition device 102a. Further, the controller 104 receives at least one of the second imagery information, the second sensory information and the second geo position from the second data acquisition device 102b.

The controller 104 extracts a first set of features from the at least one of the first imagery information, the first sensory information and the first geo-position. The first set of features corresponds to the first portion of the canopy structure. Further, the controller 104 extracts a second set of features from the at least one of the second imagery information, the second sensory information and the second geo-position. The first set of features and the second set of features extracted from the first imagery information and the second imagery information respectively include features such as, but not limited to, color, texture size, number of spots, gray area, number of pests and so on related to at least one of the soil, crops, plants, leaves, fruits and so on. The first set of features and the second set of features extracted from the first sensory information and the second sensory information respectively include features such as, but not limited to, height, orientation, biophysical and biochemical characteristic changes, measurements of leaf area index (LAI), measurements of chlorophyll fluorescence, measurements of infrared radiations and so on related to the at least one of soil, crops, plants, leaves, fruits and so on. The first set of features and the second set of features extracted using the first geo-position and the second geo-position respectively include location/positioning information of at least one of the plants, crops, fruits and so on present in the at least one portion of the canopy structure.

Based on the extracted first set of features and the second set of features, the controller 104 identifies at least one event across at least one of the first portion and the second portion of the canopy structure. Examples of the events can be, but is not limited to, diseases, pest attacks, nutrient deficiencies, growth of unwanted plants/weeds, crops of harvesting stage, and so on. The controller 104 further performs the classification of the events. The controller 104 performs the classification of the events based on factors related to the events such as, but not limited to, types, severity, geo-positioning information, sources of the events and so on.

In an embodiment, the controller 104 uses a set of rules derived from a machine learning model to identify and classify the events across the at least one of the first portion and the second portion of the canopy structure. The machine learning model can include at least one of a supervised learning algorithm, an unsupervised learning algorithm and so on. In another embodiment, the controller 104 receives a first input from a user (first user input) for identifying the events across the at least one of the first portion and the second portion of the canopy structure. The user herein refers to at least one of a farmer, an agricultural expert, an agricultural grower, a cultivator, a cropper, an agriculturalist and so on. Further, the controller 104 provides the first user input for machine learning models for continuous learning. According to the continuous learning, the machine learning model can accurately determine the events.

After identifying the events, the controller 104 generates the event map for the identified events. The controller 104 generates the event map using at least one of the first geo-position and the second geo-position. The controller 104 geo-tags the events identified across the first portion with the first geo-position in order to generate the event map for the first portion of the canopy structure. Similarly, the controller 104 geo-tags the events identified across the second portion with the second geo-position in order to generate the event map for the second portion of the canopy structure. Thus, the event map identifies one or more areas of the at least one of the first portion and the second portion of the canopy structure identified with the events.

Once the event map is generated, the controller 104 generates a remedy plan for the events identified across the at least one of the first portion and the second portion of the canopy structure. In order to generate the remedy plan, the controller 104 identifies at least one remedy for the identified events. In an embodiment, the remedies can include information related to at least one of fertilizers, manures and in response to determining the event as the nutrient deficiencies. In another embodiment, the remedies can include information related to at least one of insecticides, herbicides, fungicides, herbicides and so on in response to determining that the event as at least one of the diseases, pest attacks, infections, weeds and so on. In yet another embodiment, the remedies may include suggestion for the user to harvest the crop when the event depicts the crops of harvesting stage. It should be noted that embodiments herein are not limited to above described remedies and may identify any other type of remedies for the identified events.

The controller 104 identifies the remedies based on the classification of the events. The controller 104 can identify the remedies using a lookup table. The lookup table may include information about the one or more remedies for the events and the corresponding classification. In an embodiment, the controller 104 may receive a second input from the user (a second user input) to identify the remedies for the events. Based on the identified remedies for the identified events, the controller 104 generates the remedy plan. The remedy plan includes information such as, but not limited to, volume of a remedy, concentration of the remedy, dispersion plan of the remedy and so on for each event identified across the at least one of the first portion and the second portion of the canopy structure.

The controller 104 further generates the prescription plan based on the event plan and the remedy plan. The prescription plan includes information such as, identity of events, geo-position of each event, at least one remedy for each event and so on. Further, the controller 104 communicates the prescription plan to at least one of the first vehicle 200a and the second vehicle 200b. The controller 104 further communicates the generated prescription plan to the storage unit 106.

The storage unit 106 can be configured to store the prescription plan generated by the controller 104. The storage unit 106 includes at least one of a database, a file server, a data server, a server, cloud storage and so on.

FIG. 1 shows exemplary blocks of the system 100, but it is to be understood that other embodiments are not limited thereon. In other embodiments, the system 100 may include less or more number of blocks. Further, the labels or names of the blocks are used only for illustrative purpose and does not limit the scope of the embodiments herein. One or more blocks can be combined together to perform same or substantially similar function in the system 100.

Figure 2A:
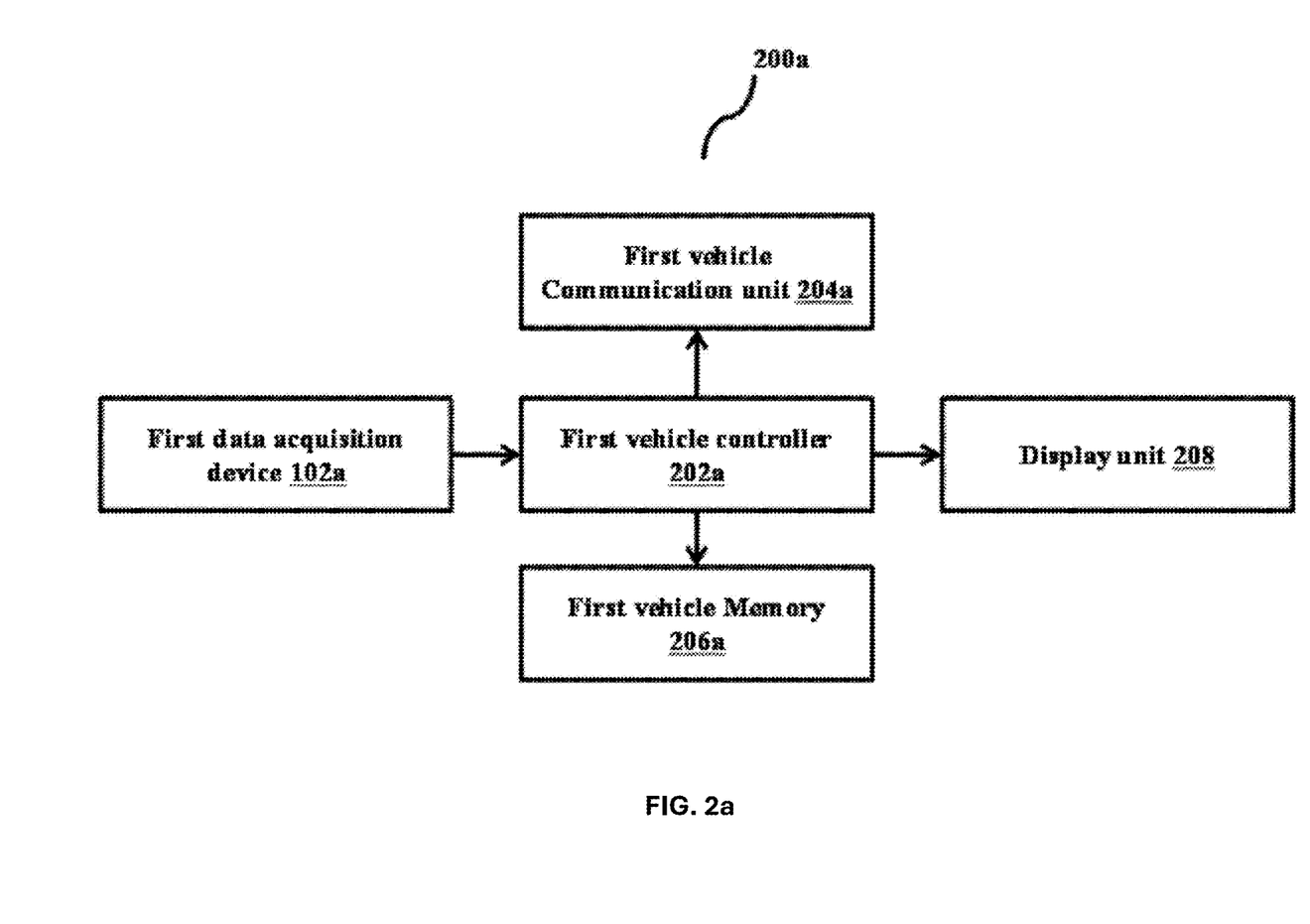
FIG. 2a is an example block diagram illustrating modules mounted on a first vehicle for collecting information from a first portion of a canopy structure, according to embodiments as disclosed herein.

FIG. 2a is an example block diagram illustrating modules mounted on the first vehicle 200a for collecting information from the first portion of the canopy structure, according to embodiments as disclosed herein. As illustrated in FIG. 2a, a first vehicle controller 202a, the first data acquisition device 102a, a first vehicle communication unit 204a, a first vehicle memory 206a and a display unit 208 can be mounted on suitable positions of the first vehicle 200a.

The first vehicle controller 202a can be configured to operate modules/devices (the first data acquisition device 102a, a first vehicle communication unit 204a, a first vehicle memory 204a and a display unit 206) associated with the first vehicle 200. The first vehicle controller 202a can be communicatively coupled to the modules/devices associated with first vehicle using at least one of the Internet, a wired network (a Local Area Network (LAN), a Controller Area Network (CAN) network, a bus network, Ethernet and so on), a wireless network (a Wi-Fi network, a cellular network, a Wi-Fi Hotspot, Bluetooth, Zigbee and so on) and so on. In an embodiment, the first vehicle controller 202a may comprise at least one of a processor, a microcontroller, storage and so on. In another embodiment, the first vehicle controller 202a can be depicted as the controller 104.

Embodiments herein considered that the first vehicle 200a and the second vehicle 200b are located initially at the first portion and the corresponding second portion of the canopy structure respectively. When the first vehicle 200a is located at the first portion of the canopy structure, the first vehicle controller 202a may operate the first data acquisition device 102a to collect the at least one of the first imagery information, the first sensory information and the first geo-position from the first portion of the crop canopy structure. The collected at least one of the first imagery, sensory and geo-position information can be communicated to the controller 104a though the first vehicle communication unit 204a.

The first vehicle controller 202a can be configured to collect the at least one of the first imagery information, the first sensory information and the first geo-position corresponding to the first portion of the crop canopy structure from the first data acquisition device 102a. In an embodiment, the first vehicle controller 202a geo-tags the first imagery information and the first sensory information with the first geo-position. The first vehicle controller 202a further stores the geo-tagged first imagery and first sensory information in the first vehicle memory 206a.

After storing the geo-tagged information, the first vehicle controller 202a directs the first vehicle 200a to a next/new first portion of the canopy structure (a next/new under canopy portion). In an embodiment, the first vehicle controller 202 may generate instructions to the user to move the first vehicle 200a to the new first portion of the canopy structure. The instructions may be the navigation directions. Once the first vehicle 200a is moved to the new first portion of the canopy structure, the first vehicle controller 202a operates the first data acquisition device 102a to collect imagery information, sensory information and geo-position from the new first portion of the canopy structure.

In an embodiment, the first vehicle controller 202a may control a second controller 202b mounted on the second vehicle 200b. The first vehicle controller 202 communicates the navigation information related to the new first portion of the canopy structure to the second vehicle controller 202b of the second vehicle 202b. Based on the received navigation information, the second vehicle controller 202b directs the drone to a new second portion of the canopy structure (the second portion) corresponding to the new first portion of the canopy structure of the canopy structure. Thus, geographic location of the first vehicle 200a and the second vehicle 200b can be properly synchronized. In addition, the proper synchronization between the first vehicle 200a and the second vehicle 200b aids in better capturing of geo-position (location) synchronized information (imagery, and sensory information) from the first portion and the second portion of the canopy structure.

The first vehicle communication unit 204a can communicate the first imagery information, the first sensory information and the first geo-position corresponding to the first portion of the canopy structure to the controller 104 through the communication network (at least one of the wired network and the wireless network). The first vehicle communication unit 204a may receive the prescription plan for the first portion of the canopy structure from the controller 104 through the communication network. The first vehicle communication unit 204a further communicates the received prescription plan to the first vehicle controller 202a for operating the devices of the first vehicle in order to deploy the prescription plan.

The display unit 208 can be configured to display the navigation directions generated by the first vehicle controller 202a on a touch screen. The navigation directions can be for the user to direct the first vehicle 200a to the new under canopy portion. In an embodiment, the display unit 208 may include at least one of a Liquid Crystal Display (LCD), Light Emitting Diode (LED) display and so on. In another embodiment, the display unit 208 may display the first imagery, the first sensory information and the geo-position collected from the first data acquisition device 102a. In yet other embodiment, the display unit 208 may display the prescription plan for the first portion of the canopy structure.

The first vehicle memory 206a can be configured to store the information collected from the first imagery acquisition device 102a and the geo-tagged first imagery and sensory information. The first vehicle memory 206a can be may include one or more computer-readable storage media. The first vehicle memory 206a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the first vehicle memory 206a may, in some examples, be considered a non-transitory storage medium. The term "non-transitory" may indicate that the storage medium is not embodied in a carrier wave or a propagated signal. However, the term "non-transitory" should not be interpreted to mean that the first vehicle memory 206a is non-movable. In some examples, the first vehicle memory 206a can be configured to store larger amounts of information than the memory. In certain examples, a non-transitory storage medium may store data that can, over time, change (e.g., in Random Access Memory (RAM) or cache).

FIG. 2a shows exemplary units of the first vehicle 200a, but it is to be understood that other embodiments are not limited thereon. In other embodiments, the first vehicle 200a may include less or more number of units. Further, the labels or names of the units are used only for illustrative purpose and does not limit the scope of the embodiments herein. One or more units can be combined together to perform same or substantially similar function in the first vehicle 200a.

Figure 2B:
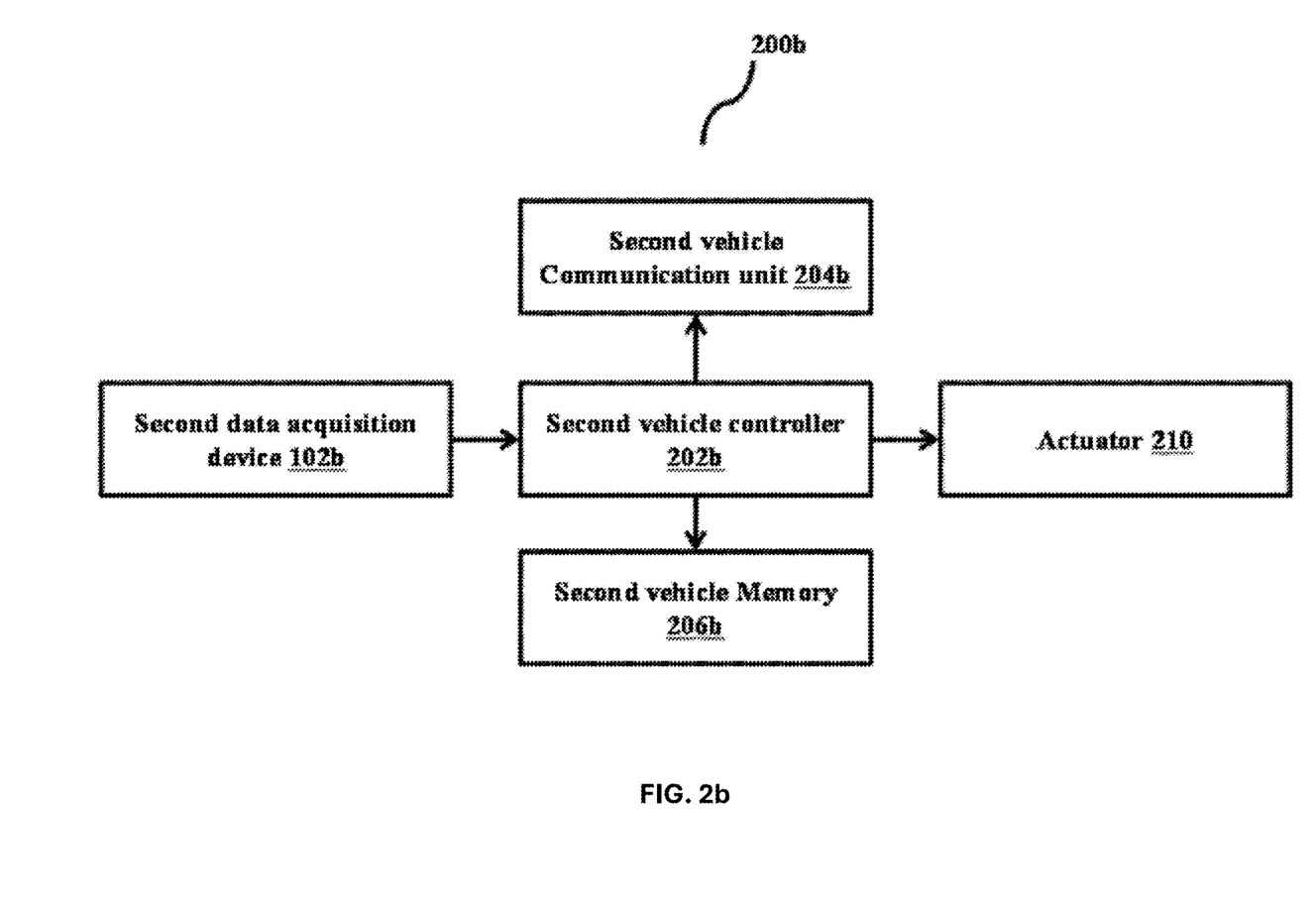
FIG. 2b is an example block diagram illustrating modules mounted on a second vehicle for collecting information from a second portion of a canopy structure, according to embodiments as disclosed herein.

FIG. 2b is an example block diagram illustrating modules mounted on the second vehicle 200b for collecting the information from the second portion of the canopy structure, according to embodiments as disclosed herein. As illustrated in FIG. 2b, the second data acquisition device 102b, the second vehicle controller 202b, a second vehicle communication unit 204b, a second vehicle memory 206b and an actuator 210 can be mounted on suitable portions of the second vehicle 202b.

The second vehicle controller 202b can be configured to operate modules/devices associated with the second vehicle (the second data acquisition device 102b, the second vehicle communication unit 204b, the second vehicle memory 206b and the actuator 210). The second vehicle controller 202b can be coupled to the modules/devices associated with the second vehicle using at least one of the Internet, a wired network (a Local Area Network (LAN), a Controller Area Network (CAN) network, a bus network, Ethernet and so on), a wireless network (a Wi-Fi network, a cellular network, a Wi-Fi Hotspot, Bluetooth, Zigbee and so on) and so on. In an embodiment, the second vehicle controller 202*b* can include at least one of a processor, a microcontroller, storage and so on.

The second vehicle controller 202*b* operates the second data acquisition device 102*b* to collect the second imagery information, the second sensory information and the geo-position corresponding to the second portion of the canopy structure when the second vehicle 200*b* is located at the second portion of the canopy structure. In another embodiment, the second data acquisition device 102*b* communicates the collected information to the controller 104 through the second vehicle communication unit 204*b*.

The second vehicle controller 202*b* can be configured to collect the second imagery information, the second sensory information and the second geo-position corresponding to the second portion from the second data acquisition device 102*b*. In an embodiment, the second vehicle controller 202*b* may store the information collected from the second data acquisition device 102*b* to the second vehicle memory 206*b*.

The second vehicle controller 202*b* can be further configured to receive the navigation instructions from the first vehicle controller 202*a* of the first vehicle 200*a*. The navigation instructions may include the location of the new first portion of the canopy structure (the new above canopy portion). On receiving the navigation instructions, the second vehicle controller 202*b* identifies location of the corresponding the new second portion of the canopy structure (new above canopy portion). Based on the identified location of the new second portion, the second vehicle controller 202*b* operates the actuator 210 to direct the second vehicle to the new second portion of the canopy structure. Once the second vehicle 200*b* is moved to the new second portion, the second vehicle controller 202*b* operates the second data acquisition device 102*b* to collect the at least one of the second imagery, sensory and geo-position information from the new second portion of the canopy structure.

The second vehicle communication unit 204*b* can communicate the second imagery information, the second sensory information and the second geo-position corresponding to the second portion of the canopy structure to the controller 104 through the communication network (at least one of the wired network and the wireless network). The second vehicle communication unit 204*b* may receive the generated prescription plan for the second portion of the canopy structure from the controller 104 through the communication network. The second vehicle communication unit 204*b* can further communicates the received prescription plan to the second vehicle controller 202*b* for operating the devices of the second vehicle 202*b* in order to deploy the prescription plan.

The actuator 210 can be configured to direct/operate the second vehicle 202*b*. The second vehicle memory 206*b* can be configured to store the information collected from the second data acquisition device 102*b*. The second vehicle memory 206*b* can be may include one or more computer-readable storage media. The second vehicle memory 206*b* may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the second vehicle memory 206*b* may, in some examples, be considered a non-transitory storage medium. The term "non-transitory" may indicate that the storage medium is not embodied in a carrier wave or a propagated signal. However, the term "non-transitory" should not be interpreted to mean that the second vehicle memory 206*b* is non-movable. In some examples, the second vehicle memory 206*b* can be configured to store larger amounts of information than the memory. In certain examples, a non-transitory storage medium may store data that can, over time, change (e.g., in Random Access Memory (RAM) or cache).

FIG. 2*b* shows exemplary units of the second vehicle 200*b*, but it is to be understood that other embodiments are not limited thereon. In other embodiments, the second vehicle 200*b* may include less or more number of units. Further, the labels or names of the units are used only for illustrative purpose and does not limit the scope of the embodiments herein. One or more units can be combined together to perform same or substantially similar function in the second vehicle 200*b*.

Figure 3:
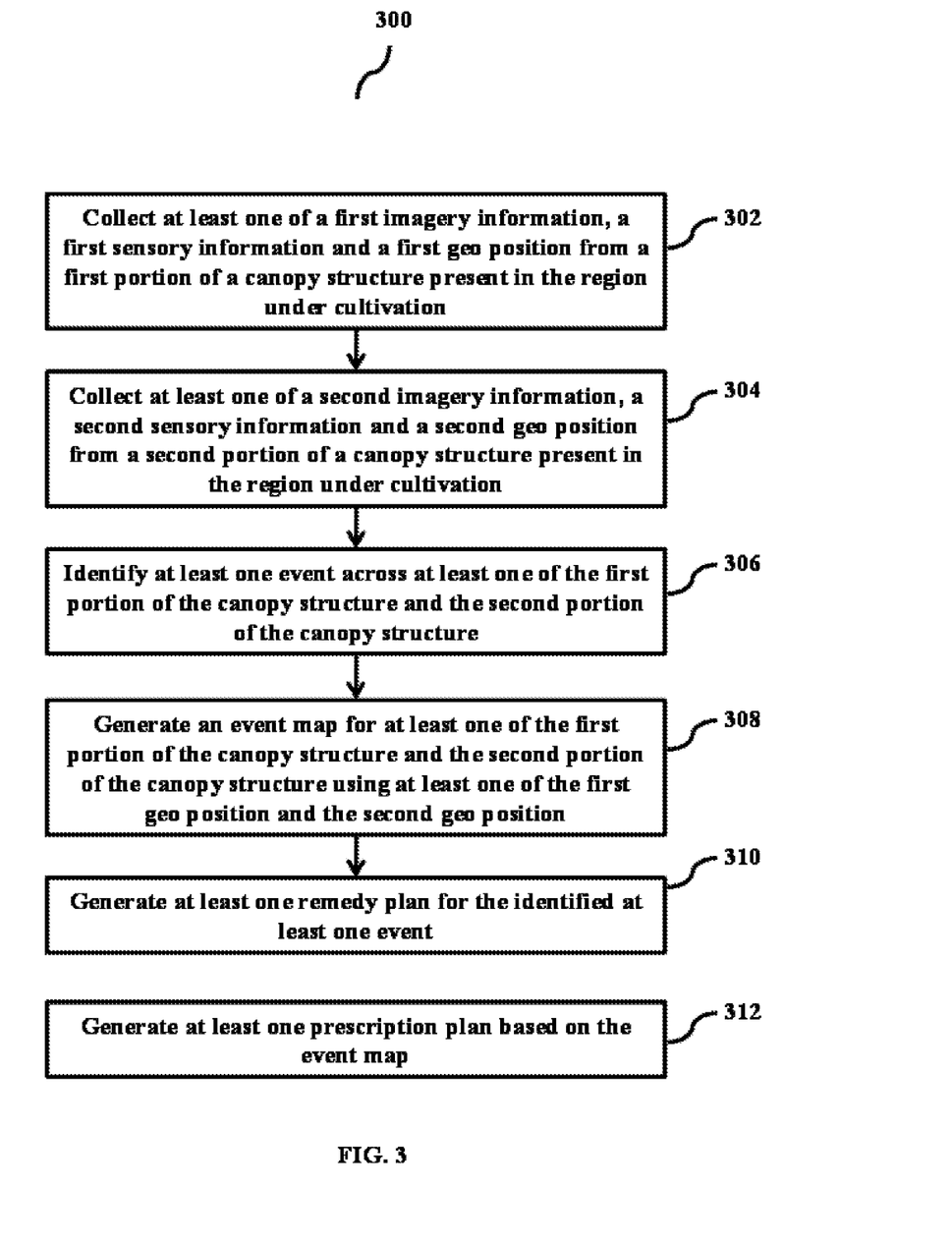
FIG. 3 is a flow diagram illustrating a method for generating prescription plan(s) for at least one portion of a canopy structure present in a region under cultivation, according to embodiments as disclosed herein.

FIG. 3 is a flow diagram 300 illustrating a method for generating the prescription plan(s) for the at least one portion of the canopy structure present in the region under cultivation, according to embodiments as disclosed herein.

At step 302, the method includes collecting, by the first data acquisition device 102*a* coupled to the first vehicle 200*a*, the first imagery information, the first sensory information and the first geo-position from the first portion of the canopy structure present in the region under cultivation. At method 304, the method includes collecting, by the second data acquisition device 102*b* coupled to the second vehicle, the second imagery information, the second sensory information and the second geo-position from the second portion of the canopy structure present in the region under cultivation.

At step 306, the method includes identifying, by the controller 104, the events across the at least one of the first portion and the second portion of the canopy structure. The controller 104 extracts the first set of features using the at least one of the first imagery information, the first sensory information and the first geo-position corresponding to the first portion of the canopy structure. Similarly, the controller 104 extracts the second set of features using the at least one of the second imagery information, the second sensory information and the second geo-position corresponding to the second portion of the canopy structure. Based on the extracted the first set of features and the second set of features, the controller 104 identifies the events across the at least one of the first portion and the second portion of the canopy structure. The controller 104 further performs the classification of events. In an embodiment, the controller 104 uses at least one of the rules derived from the machine learning model and the first user input to identify and classify the events across the at least one of the first portion and the second portion of the canopy structure.

At step 308, the method includes generating, by the controller 104, the event map for the at least one of the first portion and the second portion of the canopy structure using the at least one of the first geo-position and the second geo-position. The controller 104 geo-tags the events with the at least one of the first geo-position and the second geo-position for generating the event map for the at least one of the first portion and the second portion of the canopy structure.

At step 310, the method includes generating, by the controller 104, the remedy plan for the identified events. The controller 104 identifies the remedies for the events identified across the at least one of the first portion and the second portion based on classification of the events. In an embodiment, the controller 104 may identify the remedies based on the second user input. Based on the identified remedies, the controller 104 generates the remedy plan. The remedy plan provides information about at least one of volume of the remedy, concentration of the remedy, dispersion plan of the remedy and so on.

At step 312, the method includes generating, by the controller, the prescription plan based on the event map and the remedy plan. The prescription plan comprises at least one of the geo-position of the event, identity of the event, the at least one remedy for the event and so on.

The various actions, acts, blocks, steps, or the like in the method and the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
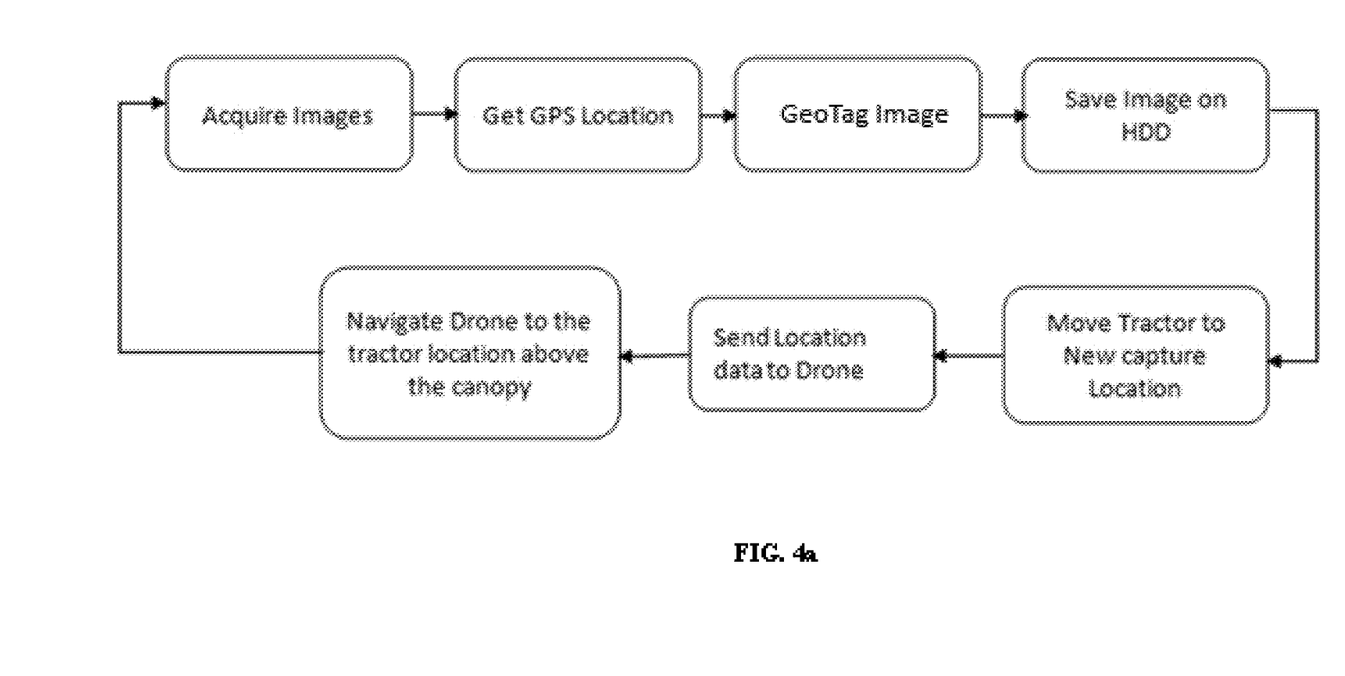
FIGS. 4a and 4b are example diagrams illustrating acquisition of information from at least one portion of a canopy structure present in a region under cultivation, according to embodiments as disclosed herein.
Figure 4B:
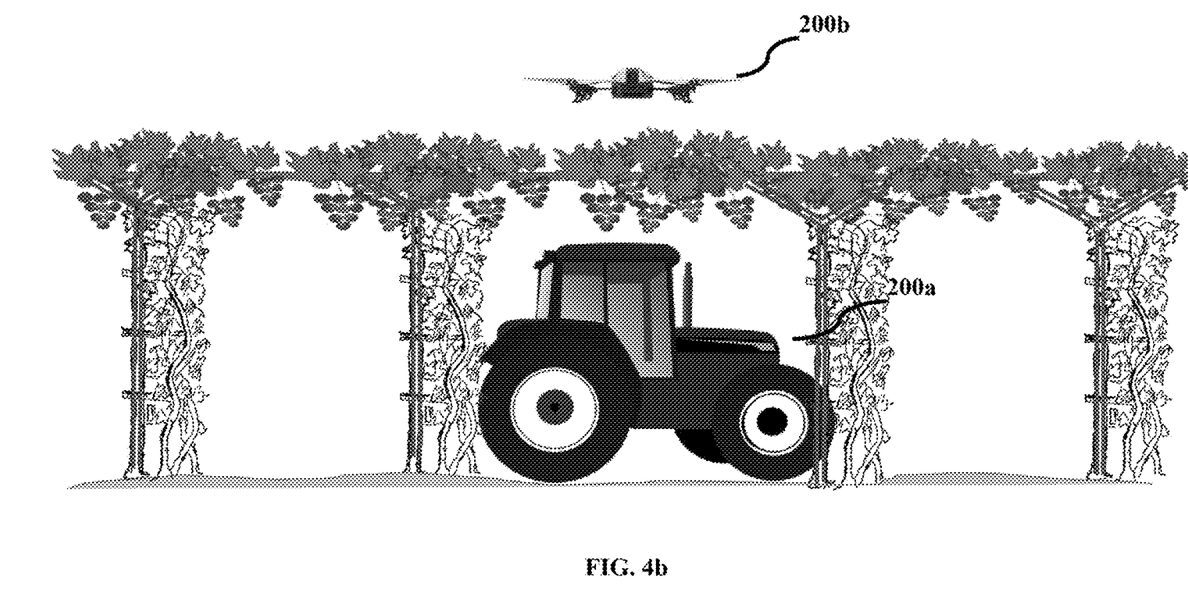

FIGS. 4a and 4b are example diagrams illustrating acquisition of information from the at least one portion of the canopy structure 200c present in the region under cultivation, according to embodiments as disclosed herein. For the ease of description and better understanding of the embodiments, the first vehicle 200a and the second vehicle 200b may be considered as a tractor 200a and a drone 200b respectively. Consider a scenario, wherein the tractor 200a and the drone 200b are located at an under canopy portion (the first portion of the canopy structure 200c) and a corresponding above canopy portion (the second portion of the canopy structure 200c) present in the region under cultivation. As illustrated in FIG. 4a, the first data acquisition device 102a of the tractor 200a may collect imagery information, sensory information and geo-position from the under canopy portion. The second data acquisition device 102b of the drone 200b may collect imagery information, sensory information and geo-position from the above canopy region. The first data acquisition device 102a and the second data acquisition device 102b communicate the collected information to the controller 104 using at least one of the wireless communication network.

Further, the first vehicle controller 202a of the tractor 200a geo-tags the collected imagery information and the sensory information from the first under canopy portion with the geo-position of the first under canopy portion. The first vehicle controller 202a of the tractor 200a stores the geo-tagged information in a hard disk (the memory 206a). Thereafter, the first vehicle controller 202a of the tractor 200a directs the tractor 200a to a new under canopy region and instructs the first data acquisition device 102a to collect information from the new under canopy region.

Further, the first vehicle controller 202a communicates the location of the new under canopy portion to the second vehicle controller 202b of the drone 200b. Based on the location received from the first vehicle controller 202a, the second vehicle controller 202b of the drone 200b directs the drone 200b to a new above canopy portion (corresponding to the new under canopy portion) and instructs the second data acquisition device 102b to collect information from the new above canopy portion. Thus, location synchronized information from the under canopy portion and the above canopy portion can be acquired for generating the prescription plan.

Consider a scenario, wherein the region under cultivation includes the canopy structure (grape vineyard) indicating plantation of grapes as illustrated in FIG. 4b. The location of the tractor 200a and the drone 200b can be synchronized controlled to obtain information from the under canopy portion and the above canopy portion. The first data acquisition device 102a of the tractor 200a captures imagery and sensory information related to at least one of soil, saplings, fruits and so on present in the under canopy portion. Further, the first data acquisition device 102a of the tractor 200a collects the geo-position corresponding to the under canopy portion.

Similarly, the second data acquisition device 102b of the drone 200b captures imagery and sensory information related to at least one of parts of plants (plants can be climbers, creepers, and so on), leaves, flowers, fruits/grapes and so on present in the above canopy portion. Further, the second data acquisition device 102b of the drone 200b collects the geo-position corresponding to the above canopy portion. Further, the controller 104 can use the collected imagery, sensory and geo-position information related to the under canopy and above canopy portion for generating the prescription plans for the at least one of the under canopy portion and the below canopy portion. The usage of both the tractor 200a and the drone 200b for collecting the information required for generating the prescription plans may cover both the under and above portion of the canopy structure. Thereby, leaving no margin of error in identifying and treating the events across the at least one portion of the canopy structure.

Figure 5:
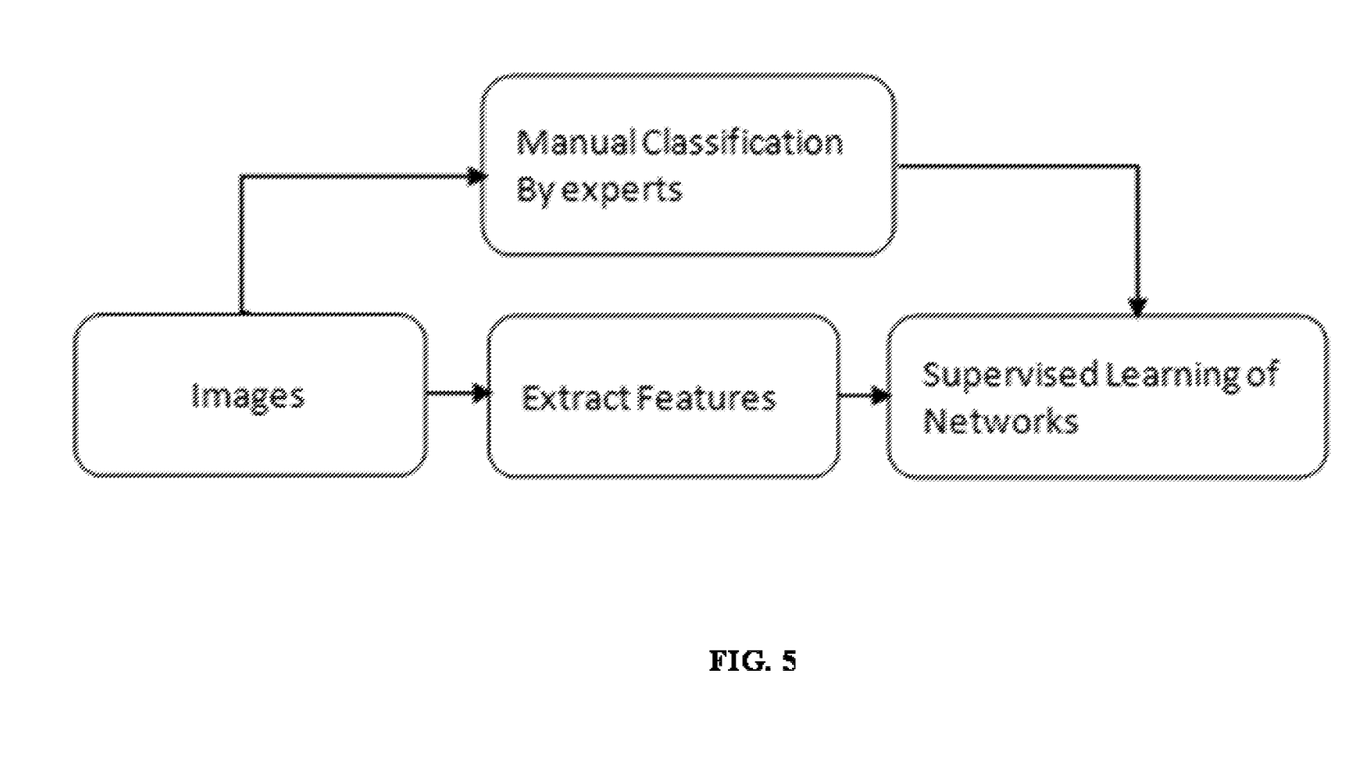
FIG. 5 is an example diagram illustrating identification of event(s) across at least one portion of a canopy structure present in a region under cultivation, according to embodiments as disclosed herein.

FIG. 5 is an example diagram illustrating identification of the events across the at least one portion of the canopy structure present in the region under cultivation, according to embodiments as disclosed herein. As illustrated in FIG. 5, the controller 104 may receive the images/imagery information related to the under canopy portion and the above canopy portion present in the region under cultivation. It should be noted that embodiments herein are not limited to the imagery information and may use the sensory information, the geo-position and so on. The controller 104 extracts the features from the received images and feeds the extracted features to the machine learning model. In an embodiment, the machine learning model may include supervised learning of networks which can be further trained by the first user input received from experts. The first user input includes information about manually identified events across the portion of the canopy structure and manually performed classification of the events. On receiving the extracted features, the machine learning model identifies the events across the at least one of the under canopy portion and the above canopy portion. Further, the machine learning model classifies the events identified across the at least one of the under canopy portion and the above canopy portion.

Figure 6:
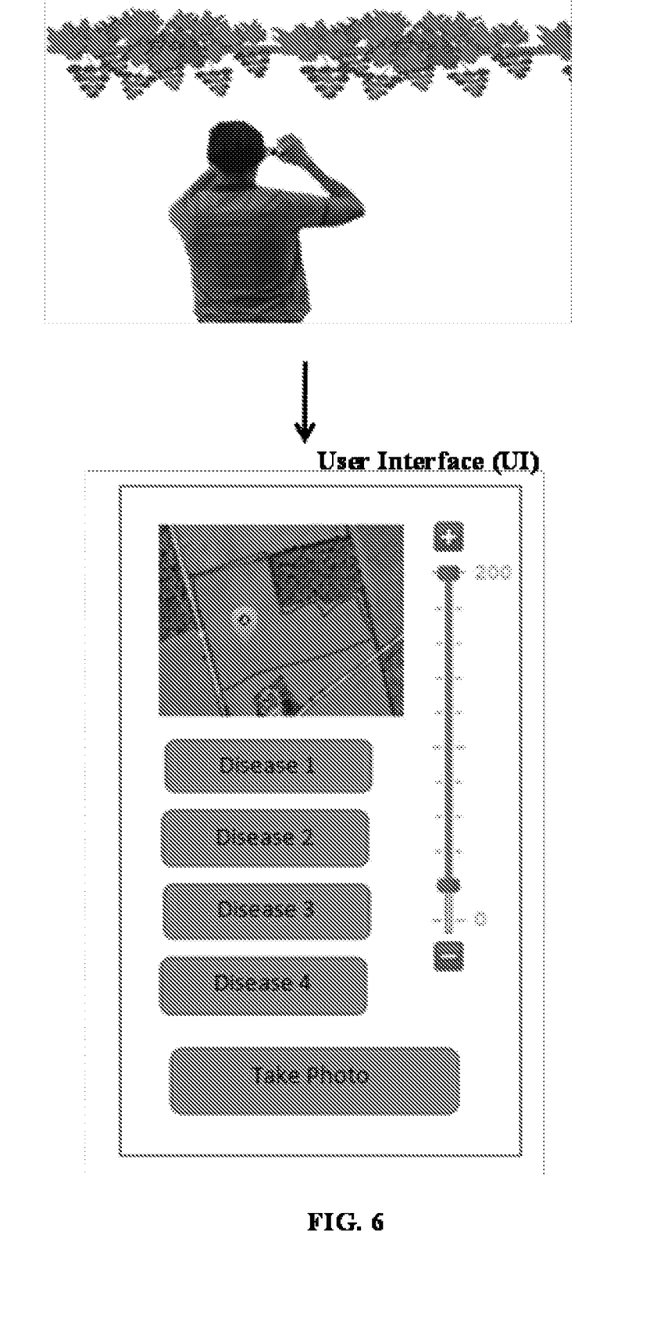
FIG. 6 is an example scenario depicting generation of an event map for at least one portion of a canopy structure based on user inputs, according to embodiments as disclosed herein.

FIG. 6 is an example scenario depicting generation of the event map for the at least one portion of the canopy structure based on user inputs, according to embodiments as disclosed herein. As illustrated in FIG. 6, consider that the crop canopy structure present in the region under cultivation indicates the grape vineyard. The user (farmer, expert and so on) may identify the events across the at least one portion of the grape vineyard by surveying the grape vineyard. For example, the events indicate at least one of possible pest attacks, infections, diseases and so on. The user can communicate the information to the controller 104 using an application supported by a user device (mobile phone, smart phone, laptop, tablet and so on). In an embodiment, an application user interface (UI) may be presented to the user to enter information about the identified events.

The application UI includes buttons and a slider bar which enables the user/experts to select the disease/infection type and input severity of the disease respectively. Further, the application UI may comprise of a panel which shows current map and live position of the user. Thus, the user may generate the event map by manually geo-tagging at least one area of the at least one portion of the canopy structure identified with the diseases, infections, pest attacks and so on. In addition, the application UI may provide a photo button to capture images of the areas of the at least one portion (under and above canopy portions) of the canopy structure, which are identified with diseases, infections, pest attack and so on.

Further, the controller 104 uses the information entered by the user related to the events and the manually generated event map to generate the prescription plan for the at least one portion of the grape vineyard. The generated prescription plan decides a type of remedy (pesticides, insecticides, fungicides and so on), amount of remedy to be applied on the particular portions of the grape vineyard which are identified with the events.

Figure 7:
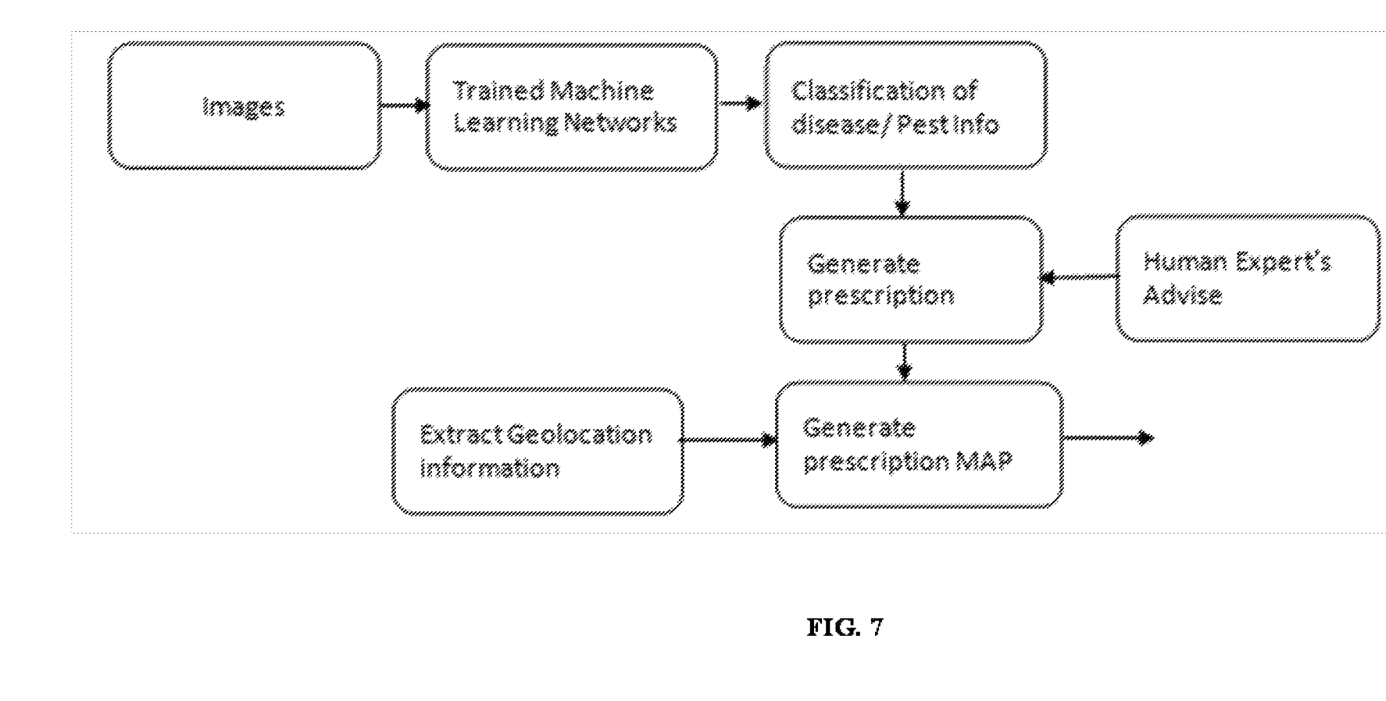
FIG. 7 is an example diagram illustrating generation of prescription plan(s) for at least one portion of a canopy structure present in a region under cultivation, according to embodiments as disclosed herein.

FIG. 7 is an example diagram illustrating generation of the prescription plans for the at least one portion of the canopy structure present in a region under cultivation, according to embodiments as disclosed herein. As illustrated in FIG. 7, the controller 104 receives the images (the sensory information and the geo-position) related to the under canopy portion and the above canopy portion. The controller 104 feeds the images to the machine learning model (supervised learning of networks) for identifying and classifying the events (diseases/pest attacks) across the at least one of the under canopy portion and the above canopy portion. Based on the classification of the events, the controller 104 generates the event map which provides geo-location information of the areas of the at least one of the under canopy portion and the above canopy portion identified with the events.

Further, the controller 104 generates the remedy plan for the events by identifying the remedies/prescriptions for the identified events. In an embodiment, the controller 104 may receive the second user input for identifying the remedies. Based on the event map and the remedy plan, the controller 104 generates the prescription plan for the at least one of the under canopy portion and the above canopy portion.

The embodiments disclosed herein can be implemented through at least one software program running on at least one hardware device and performing network management functions to control the elements. The elements shown in FIG. 1 and FIG. 2 can be at least one of a hardware device, or a combination of hardware device and software module.

The embodiments herein disclose methods and systems for generating a prescription plan for a region under cultivation. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A system (100) for generating a prescription plan for an over canopy portion and an under canopy portion of a canopy structure present in a region under cultivation, the canopy structure holds one or more vine plants, the system (100) comprising:
 a first data acquisition device (102a) coupled to a first vehicle (200a), the first data acquisition device (102a) configured to collect at least one of a first imagery information, a first sensory information, and a first geo position from the over canopy portion of the canopy structure present in the region under cultivation;
 a second data acquisition device (102b) coupled to a second vehicle (200b), the second data acquisition device (102b) configured to collect at least one of a second imagery information, a second sensory information, and a second geo position from the under canopy portion of the canopy structure present in the region under cultivation; and
 a controller (104) communicatively coupled to the first data acquisition device (102a) and the second data acquisition device (102b), the controller (104) configured to:
  extract at least one first feature from at least one of the first imagery information, the first sensory information and the first geo position;
  extract at least one second feature from at least one of the second imagery information, the second sensory information and the second geo position;
  identify at least one event using the at least one extracted first feature and the at least one extracted second feature;
  perform classification of the at least one identified event;
  identify at least one remedy for the at least one event, wherein the at least one remedy is identified based on classification of the at least one event;
  generate at least one remedy plan using the identified at least one remedy for the at least one event, wherein the remedy plan comprises volume of a remedy, concentration of the remedy, and dispersion plan of the remedy; and
  generate at least one prescription plan based on an event map and the at least one remedy plan,
 wherein;
 a first vehicle controller (202a) of the first vehicle (200a) is configured to control a second vehicle controller (202b) of the second vehicle (200b) for synchronizing geographical location of the first vehicle (200a) and the second vehicle (200b), wherein the geographical location of the first vehicle (200a) and the second vehicle (200b) is synchronized to collect geo-position and at least one of the first imagery information, the first sensory information, the second imagery information and the second sensory information from the over canopy portion and under canopy portion of the canopy structure.

2. The system (100) as claimed in claim 1, wherein the controller (104) is communicatively coupled to the first data acquisition device (102a) and the second data acquisition device (102b) using at least one wireless communication network.

3. The system (100) as claimed in claim 1, wherein the first vehicle (200a) comprises
an actuator (210) for applying at least one remedy to the over canopy portion.

4. The system as claimed in claim 3, wherein the actuator (210) on the first vehicle (200a) comprises a robotic arm (208a), said robotic arm (208a) having
at least one joint actuator (212a-212n) configured to operate at least one reservoir tank (402) associated with the first vehicle (200a) at a particular period of time based on the at least one prescription plan.

5. The system (100) as claimed in claim 1, wherein the controller (104) is configured to use at least one rule to identify the at least one event and perform classification of the at least one event.

6. The system (100) as claimed in claim 1, wherein the controller (104) is configured to receive a first user input to identify the at least one event.

7. The system (100) as claimed in claim 1, wherein the controller (104) is configured to receive a second user input to identify the at least one remedy for the at least one event.

8. The system (100) as claimed in claim 1, wherein the at least one prescription plan comprises geo position of the at least one event, identity of the at least one event, and the at least one remedy for the at least one event.

9. A method for generating a prescription plan for an over canopy portion and an under canopy portion of a canopy structure present in a region under cultivation, the canopy structure holds one or more vine plants, the method comprising:
collecting, by a first data acquisition device (102a) coupled to a first vehicle (200a), at least one of a first imagery information, a first sensory information and a first geo position from the over canopy portion of the canopy structure present in the region under cultivation;
collecting, by a second data acquisition device (102b) coupled to a second vehicle (200b), at least one of a second imagery information, a second sensory information and a second geo position from the under canopy portion of the canopy structure present in the region under cultivation;
extracting, by a controller (104), at least one first feature from at least one of the first imagery information, the first sensory information and the first geo position;
extracting, by the controller (104), at least one second feature from at least one of the second imagery information, the second sensory information and the second geo position;
identifying, by the controller (104), at least one event using the at least one extracted first feature and the at least one extracted second feature;
performing classification of the at least one event;
identifying, by the controller (104), at least one remedy for the at least one event, wherein the at least one remedy is identified based on classification of the at least one event;
generating, by the controller (104), at least one remedy plan using the identified at least one remedy for the at least one event, wherein the remedy plan comprises volume of a remedy, concentration of the remedy, and dispersion plan of the remedy;
generating, by the controller (104), at least one prescription plan based on an event map and the at least one remedy plan; and
controlling, by a first vehicle controller (202a), the second vehicle controller (202b) for synchronizing geographical location of the first vehicle (200a) and the second vehicle (200b), wherein the geographical location of the first vehicle (200a) and the second vehicle (200b) is synchronized to collect geo-position and at least one of the first imagery information, the first sensory information, the second imagery information and the second sensory information from the over canopy portion and the under canopy portion of the canopy structure.

10. The method as claimed in claim 9, wherein the controller (104) is communicatively coupled to the first data acquisition device (102a) and the second data acquisition device (102b) using at least one wireless communication network.

11. The method as claimed in claim 9, wherein the first vehicle (200a) comprises
an actuator (210) for applying at least one remedy to the over canopy portion.

12. The method as claimed in claim 9, wherein the method comprises utilizing, by the controller (104), at least one rule to identify the at least one event and perform classification of the at least one event.

13. The method as claimed in claim 9, wherein the method comprises receiving, by the controller (104), a first user input to identify the at least one event.

14. The method as claimed in claim 9, wherein the method comprises receiving, by the controller (104), a second user input to identify the at least one remedy for the at least one event.

15. The method as claimed in claim 9, wherein the prescription plan comprises geo position of the at least one event, identity of the at least one event, and the at least one remedy for the at least one event.

* * * * *